United States Patent
Chae et al.

(10) Patent No.: US 12,199,279 B2
(45) Date of Patent: Jan. 14, 2025

(54) NEGATIVE ELECTRODE FOR LITHIUM SECONDARY BATTERY, METHOD OF PREPARING THE SAME, AND LITHIUM SECONDARY BATTERY INCLUDING NEGATIVE ELECTRODE FOR LITHIUM SECONDARY BATTERY

(71) Applicant: LG ENERGY SOLUTION, LTD., Seoul (KR)

(72) Inventors: Oh Byong Chae, Daejeon (KR); Sang Wook Woo, Daejeon (KR); Je Young Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 252 days.

(21) Appl. No.: 16/955,556

(22) PCT Filed: Feb. 21, 2019

(86) PCT No.: PCT/KR2019/002173
§ 371 (c)(1),
(2) Date: Jun. 18, 2020

(87) PCT Pub. No.: WO2019/164319
PCT Pub. Date: Aug. 29, 2019

(65) Prior Publication Data
US 2020/0321612 A1    Oct. 8, 2020

(30) Foreign Application Priority Data
Feb. 23, 2018    (KR) .......................... 10-2018-0022209

(51) Int. Cl.
*H01M 4/38*    (2006.01)
*H01M 4/02*    (2006.01)
(Continued)

(52) U.S. Cl.
CPC ......... *H01M 4/386* (2013.01); *H01M 4/0402* (2013.01); *H01M 4/133* (2013.01);
(Continued)

(58) Field of Classification Search
CPC .... H01M 4/386; H01M 4/0402; H01M 4/133; H01M 4/64; H01M 10/0525; H01M 2004/027
See application file for complete search history.

(56) References Cited

U.S. PATENT DOCUMENTS 6,001,139 A     12/1999  Asanuma et al.
2007/0218365 A1  9/2007  Takezawa et al.
(Continued)

FOREIGN PATENT DOCUMENTS

CN    102856532 A    1/2013
CN    105047986 A    11/2015
(Continued)

OTHER PUBLICATIONS

Extended European Search Report issued from the European Patent Office dated Dec. 16, 2020 for the corresponding European patent application No. 19757880.0.
(Continued)

*Primary Examiner* — Brian R Ohara
*Assistant Examiner* — Emily Elizabeth Freeman
(74) *Attorney, Agent, or Firm* — Bryan Cave Leighton Paisner LLP

(57) ABSTRACT

The present invention provides a negative electrode for a lithium secondary battery, which includes a negative electrode current collector; and a negative electrode active material layer which is formed on the negative electrode current collector and includes a negative electrode active material including a silicon-based material, wherein the negative electrode active material includes lithium interca-
(Continued)

lated by pre-lithiation, and the extent of pre-lithiation of the negative electrode active material, calculated by a specific equation, is 5 to 50%.

10 Claims, 3 Drawing Sheets

(51) Int. Cl.
    *H01M 4/04*         (2006.01)
    *H01M 4/133*      (2010.01)
    *H01M 4/64*        (2006.01)
    *H01M 10/0525*    (2010.01)

(52) U.S. Cl.
    CPC ......... *H01M 4/64* (2013.01); *H01M 10/0525* (2013.01); *H01M 2004/027* (2013.01)

(56) References Cited

U.S. PATENT DOCUMENTS

| | | | | |
|---|---|---|---|---|
| 2008/0274408 A1* | 11/2008 | Jarvis | ............... | H01M 4/621 |
| | | | | 429/231.95 |
| 2008/0311464 A1 | 12/2008 | Krause et al. | | |
| 2013/0157106 A1* | 6/2013 | Lee | ............... | H01M 4/587 |
| | | | | 429/211 |
| 2015/0333332 A1* | 11/2015 | Wietelmann | ......... | H01M 4/382 |
| | | | | 429/217 |
| 2015/0333385 A1 | 11/2015 | Sun et al. | | |
| 2016/0141596 A1 | 5/2016 | Uhm et al. | | |
| 2016/0181594 A1* | 6/2016 | Balogh | ............... | H01M 4/0471 |
| | | | | 156/247 |
| 2016/0204430 A1 | 7/2016 | Hiraoka et al. | | |
| 2017/0256782 A1 | 9/2017 | Raman et al. | | |
| 2017/0338480 A1 | 11/2017 | Kim et al. | | |
| 2019/0067697 A1* | 2/2019 | Ohsawa | ............ | H01M 10/0525 |
| 2020/0119396 A1* | 4/2020 | Ose | ............ | H01M 4/364 |

FOREIGN PATENT DOCUMENTS

| | | | |
|---|---|---|---|
| CN | 105493330 A | | 4/2016 |
| CN | 105845894 A | | 8/2016 |
| JP | 2004-047147 A | | 2/2004 |
| JP | 2005-038720 A | | 2/2005 |
| JP | 2014-044921 A | | 3/2014 |
| KR | 10-1998-0702606 A | | 8/1998 |
| KR | 10-2008-0050482 A | | 6/2008 |
| KR | 10-2012-0073603 A | | 7/2012 |
| KR | 10-1162794 B1 | | 7/2012 |
| KR | 10-2012-0092529 A | | 8/2012 |
| KR | 101274495 B1 | * | 6/2013 |
| KR | 10-2014-0032577 A | | 3/2014 |
| KR | 10-2014-0046496 A | | 4/2014 |
| KR | 10-2015-0014676 A | | 2/2015 |
| KR | 10-2015-0015404 A | | 2/2015 |
| KR | 10-2015-0032014 A | | 3/2015 |
| KR | 10-2016-0094652 A | | 8/2016 |
| KR | 10-2016-0149862 A | | 12/2016 |
| KR | 10-2017-0111513 A | | 10/2017 |
| WO | 2015/016482 A1 | | 2/2015 |

OTHER PUBLICATIONS

Pan et al., "Improved electrochemical performance of micro-sized SiO-based composite anode by prelithiation of stabilized lithium metal powder," Journal of Power Sources, vol. 347, 2017, pp. 170-177, XP055757579.

International Search Report (with partial translation) and Written Opinion issued in corresponding International Patent Application No. PCT/KR2019/002173, dated May 28, 2019.

* cited by examiner

[FIG. 1]

[FIG. 2]
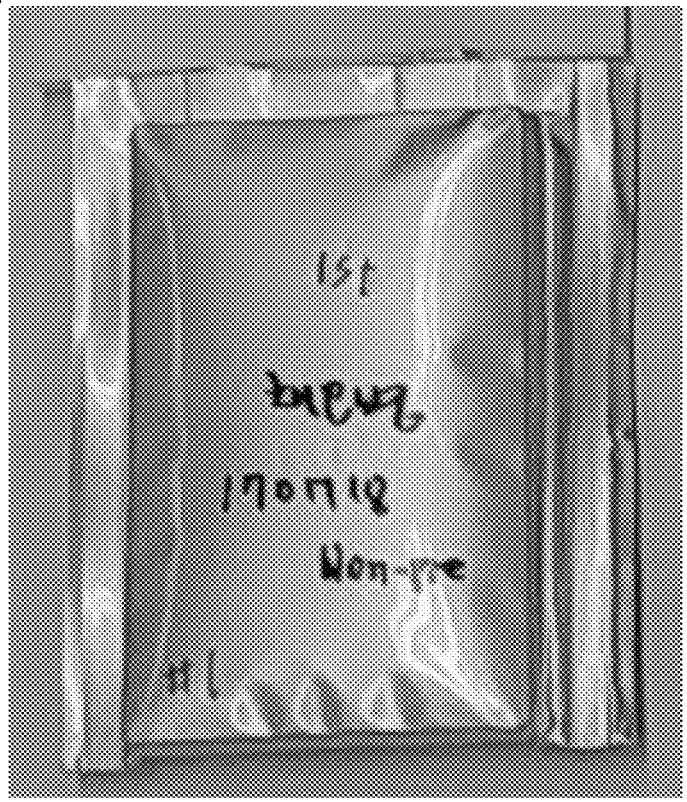
[FIG. 3]
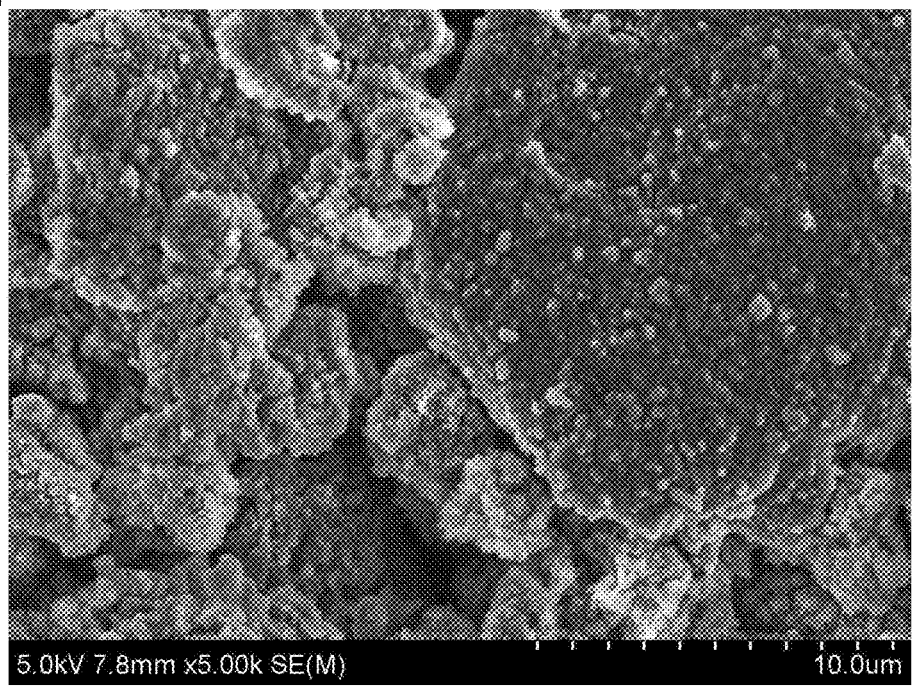

[FIG. 4]
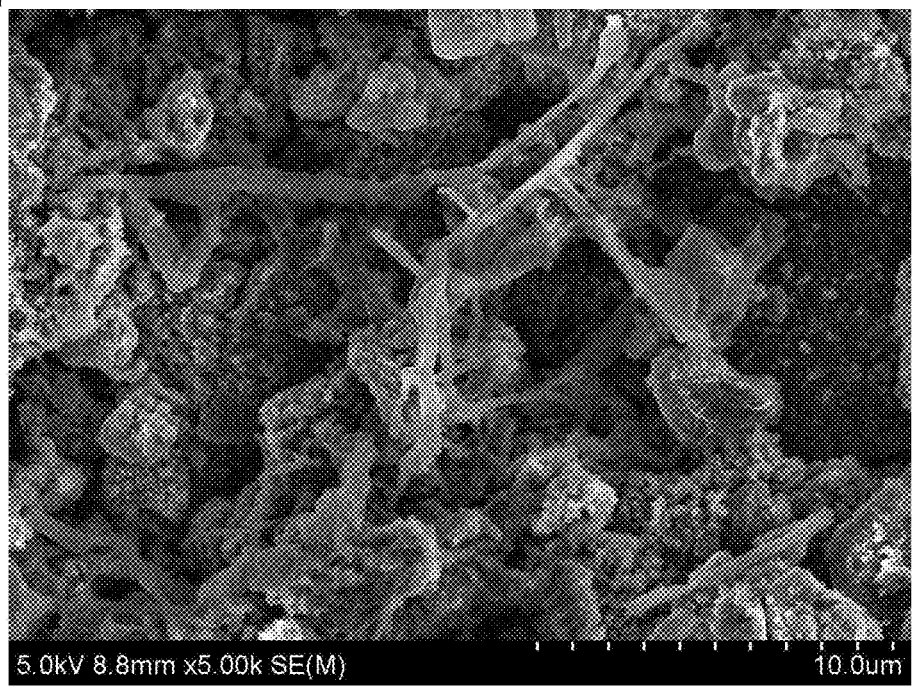

NEGATIVE ELECTRODE FOR LITHIUM SECONDARY BATTERY, METHOD OF PREPARING THE SAME, AND LITHIUM SECONDARY BATTERY INCLUDING NEGATIVE ELECTRODE FOR LITHIUM SECONDARY BATTERY

CROSS-REFERENCE TO RELATED APPLICATION

This application claims priority to and the benefit of Korean Patent Application NO. 10-2018-0022209, filed on Feb. 23, 2018, the disclosure of which is incorporated herein by reference in its entirety.

TECHNICAL FIELD

The present invention relates to a negative electrode for a lithium secondary battery, a method of preparing the same, and a lithium secondary battery including the negative electrode for a lithium secondary battery.

BACKGROUND ART

According to technological development and increasing demand for various devices, the demand for a secondary battery as an energy source is rapidly increasing, and among secondary batteries, a lithium secondary battery having a high energy density, a high voltage, a long cycle lifespan and a low self-discharge rate has been commercialized and widely used.

The lithium secondary battery generally uses, as a positive electrode active material, a lithium-containing cobalt oxide ($LiCoO_2$) with a layered crystal structure, a lithium-containing manganese oxide such as $LiMnO_2$ with a layered crystal structure or $LiMn_2O_4$ with a spinel crystal structure, or a lithium-containing nickel oxide ($LiNiO_2$). In addition, as a negative electrode active material, a carbon-based material is usually used, and recently, due to growing demand for a high-capacity secondary battery, technology using a silicon-based negative electrode active material such as metallurgical silicon or silicon oxide, which has an effective capacity at least 10 times higher than a carbon-based material is being studied.

However, a lithium secondary battery has various problems, and some of the problems are involved in the preparation and operation characteristics of a negative electrode.

For example, in the case of a carbon-based negative electrode active material, since a solid electrolyte interface (SEI) layer is formed on the surface of the negative electrode active material during initial charging/discharging (activation), an initial irreversibility phenomenon may occur, and there are problems of disrupting the SEI layer during continuous charging/discharging, and reducing battery capacity due to depletion of an electrolyte solution during regeneration may also occur.

While the metallurgical silicon exhibits high capacity, a volume expansion rate becomes 300% or more as a cycle progresses, and the resistance and side reactions with an electrolyte solution may increase. As a result, problems caused by the formation of the SEI layer, for example, the damage to an electrode structure, may be aggravated.

Compared with metallurgical silicon, since silicon oxide has a low volume expansion rate and excellent durability and lifespan characteristics, it can also be considered for use as a negative electrode active material. However, the silicon oxide also has a problem of high initial irreversibility due to the formation of an SEI layer during charging and $Li_2O$ generated by oxygen in an active material.

To solve the problems, studies on a method of replacing oxygen in a silicon-based negative electrode active material causing high irreversible capacity with lithium oxide by performing pre-lithiation of the silicon-based negative electrode active material are actively progressing.

Conventionally, for the pre-lithiation of a negative electrode, a method of intercalating lithium ions into a negative electrode active material by pressing a lithium source such as a lithium metal thin film on the surface of a negative electrode active material layer was generally used. While this method can extend a lifespan by reducing initial irreversibility of the silicon-based negative electrode active material, during the pre-lithiation of the silicon-based negative electrode active material with a lithium source, a lot of by-products are generated, and lithium oxide is produced almost only on the surface of the silicon-based negative electrode active material, and therefore, there is a limit to reducing irreversibility.

PRIOR ART LITERATURE

Patent Literature

Korean Unexamined Patent Application Publication NO. 10-2012-0092529

DISCLOSURE

Technical Problem

The present invention is directed to providing a negative electrode for a lithium secondary battery, which exhibits an excellent capacity characteristic and an excellent effect of preventing an increase in resistance by effectively reducing a side reaction with an electrolyte solution and gassing caused thereby during charging/discharging of a negative electrode.

In addition, the present invention is directed to providing a method of preparing a negative electrode for a lithium secondary battery.

In addition, the present invention is directed to providing a lithium secondary battery including the above-described negative electrode for a lithium secondary battery, and a method of preparing the same.

Technical Solution

The present invention provides a negative electrode for a lithium secondary battery, which includes: a negative electrode current collector; and a negative electrode active material layer which is formed on the negative electrode current collector and includes a negative electrode active material including a silicon-based material, wherein the negative electrode active material includes lithium intercalated by pre-lithiation, and the extent of pre-lithiation, calculated by Equation 1 below, of the negative electrode active material is 5 to 50%.

$$\text{Extent of pre-lithiation}(\%) = (A_0 - A)/A_0 \times 100 \qquad \text{[Equation 1]}$$

In Equation 1, $A_0$ is a charge capacity of a half-cell prepared of a negative electrode including a negative electrode active material before pre-lithiation and lithium metal, which is a counter electrode, when being charged at a current density of 0.1C up to a voltage of 0.005V in a CC mode, followed by charging at the same voltage of 0.005V and a current density of 0.005C in a CV mode, and A is a charge capacity of a half-cell prepared of a negative electrode for a lithium secondary battery including a negative electrode active material after pre-lithiation and lithium metal, which is a counter electrode, when being charged at a current density of 0.1C up to a voltage of 0.005V in a CC mode, followed by charging at the same voltage of 0.005V and a current density of 0.005C in a CV mode.

In addition, the present invention provides a lithium secondary battery including the above-described negative electrode for a lithium secondary battery.

In addition, the present invention provides a method of preparing a negative electrode for a lithium secondary battery, which includes: forming a negative electrode active material layer including a negative electrode active material including a silicon-based material on a negative electrode current collector; coating the negative electrode active material layer with lithium metal powder at a loading amount of 0.05 to 0.5 mg/cm$^2$; pressing the negative electrode active material layer coated with the lithium metal powder; wetting the pressed negative electrode active material layer with a first electrolyte solution; and drying the wet negative electrode active material layer.

Advantageous Effects

A negative electrode for a lithium secondary battery of the present invention includes a negative electrode active material having a specific extent of pre-lithiation, and therefore, a gas generated by a side reaction with an electrolyte solution in charging/discharging of a negative electrode can be effectively reduced. As a result, the negative electrode for a lithium secondary battery of the present invention has an excellent capacity characteristic, an excellent effect of preventing an increase in resistance, and an excellent effect of enhancing a cycle characteristic.

In addition, in the method of preparing a negative electrode for a lithium secondary battery of the present invention, an electrolyte wetting process is performed in the assembly of the negative electrode. Accordingly, uniform lithiation of the negative electrode active material is possible, and a stable film can be formed on the surface of an active material layer, thereby effectively reducing gassing caused by a side reaction with an electrolyte solution.

Therefore, a lithium secondary battery including the above-described negative electrode for a lithium secondary battery can have an excellent capacity characteristic and an excellent cycle characteristic, and an increase in resistance according to continuous charging/discharging can be effectively prevented.

DESCRIPTION OF DRAWINGS

FIG. 1 is an image showing the appearance of a battery according to Example 1 after 300 cycles of charging/discharging.

FIG. 2 is an image showing the appearance of a battery according to Comparative Example 1 after 300 cycles of charging/discharging.

FIG. 3 is a field emission scanning electron microscope (FE-SEM) image showing the appearance of a negative electrode active material layer observed after 300 cycles of charging/discharging in the battery according to Example 1.

FIG. 4 is an FE-SEM image showing the appearance of a negative electrode active material layer observed after 300 cycles of charging/discharging in the battery according to Comparative Example 3.

MODES OF THE INVENTION

Hereinafter, the present invention will be described in further detail to help in understanding the present invention.

Hereinafter, the present invention will be described in further detail to help understanding of the present invention. Here, terms and words used in the specification and claims should not be construed as limited to general or dictionary terms, and should be interpreted with the meaning and concept in accordance with the technical idea of the present invention based on the principle that the inventors have appropriately defined the concepts of terms in order to explain the invention in the best way.

The terms used in the specification are used only to explain specific examples, not to limit the present invention. Singular expressions include plural referents unless clearly indicated otherwise in the context.

The terms "include" and "have" used herein designate the presence of characteristics, numbers, stages, components or a combination thereof, and it should be understood that the possibility of the presence or addition of one or more other characteristics, numbers, stages, components, or a combination thereof is not excluded in advance.

Negative electrode for lithium secondary battery Hereinafter, a negative electrode for a lithium secondary battery according to the present invention will be described.

Specifically, the negative electrode for a lithium secondary battery of the present invention includes a negative electrode current collector, and a negative electrode active material layer which is formed on the negative electrode current collector and includes a negative electrode active material including a silicon-based material, wherein the negative electrode active material includes lithium intercalated by pre-lithiation, and the extent of pre-lithiation, calculated by Equation 1 below, of the negative electrode active material is 5 to 50%.

$$\text{Extent of pre-lithiation}(\%) = (A_0 - A)/A_0 \times 100 \quad \text{[Equation 1]}$$

In Equation 1, $A_0$ is a charge capacity of a half-cell prepared of a negative electrode including a negative electrode active material before pre-lithiation and lithium metal, which is a counter electrode, when being charged at a current density of 0.1C up to a voltage of 0.005V in a CC mode, followed by charging at the same voltage of 0.005V and a current density of 0.005C in a CV mode, and A is a charge capacity of a half-cell prepared of a negative electrode for a lithium secondary battery including a negative electrode active material after pre-lithiation and lithium metal, which is a counter electrode, when being charged at a current density of 0.1C up to a voltage of 0.005V in a CC mode, followed by charging at the same voltage of 0.005V and a current density of 0.005C in a CV mode.

The negative electrode current collector is not particularly limited as long as it has high conductivity without causing a chemical change to a battery, and may be, specifically, copper, stainless steel, aluminum, nickel, titanium, calcined carbon, copper or stainless steel whose surface is treated with carbon, nickel, titanium or silver, or an aluminum-cadmium alloy.

The negative electrode current collector may have various forms, such as a film, a sheet, a foil, a net, a porous body, a foam, a non-woven fabric, etc.

In addition, the negative electrode current collector may have a thickness of 3 to 500 μm, preferably, 4 to 400 μm, and more preferably 5 to 300 μm. The thickness of the negative electrode current collector is not necessarily limited within the above range, which may vary depending on the total capacity of the negative electrode for a lithium secondary battery.

The negative electrode active material layer is formed on the negative electrode current collector.

The negative electrode active material layer includes a silicon-based material.

The silicon-based material may impart an excellent capacity characteristic and excellent durability to the negative electrode for a lithium secondary battery or negative electrode active material layer of the present invention. In addition, since the negative electrode active material including a silicon-based material may effectively prevent the deterioration of the cycle characteristic according to continuous charging/discharging by pre-lithiation to be described later and the range of the extent of pre-lithiation, thereby enhancing a cycle characteristic.

The silicon-based material may include a compound represented by $SiO_x$ ($0 \leq x < 2$). Since $SiO_2$ may not be reacted with a lithium ion and thus not store lithium, x is preferably in the above range. More preferably, the silicon-based material may be SiO.

To further enhance a cycle characteristic or battery lifespan performance, the negative electrode active material may further include a carbon-based material, in addition to the above-described silicon-based material.

Specifically, the carbon-based material may be one or more carbon-based materials selected from the group consisting of artificial graphite, natural graphite, hard carbon, soft carbon, carbon black, acetylene black, Ketjen black, Super P, graphene and fibrous carbon, and preferably, artificial graphite, natural graphite and a mixture of the artificial graphite and the natural graphite.

Specifically, the negative electrode active material may use both of the silicon-based material and the carbon-based material to simultaneously improve a capacity characteristic and a cycle characteristic, and specifically, the negative electrode active material may include the carbon-based material and the silicon-based material at a weight ratio of 50:50 to 95:5, and preferably 60:40 to 80:20. This range of the weight ratio is preferable for simultaneous improvement of the cell capacity and cycle characteristics.

The negative electrode active material includes lithium intercalated by pre-lithiation.

The lithium may be intercalated into and/or on the surface of the negative electrode active material by pre-lithiation. The lithium may be intercalated into the negative electrode active material in the form of a lithium ion, a lithium compound and/or metal lithium, or alloyed by a reaction with the negative electrode active material after intercalation.

The pre-lithiation used herein may refer to lithiation previously performed by intercalating lithium into a negative electrode active material before the operation of a battery or before the injection of or wetting with an electrolyte solution after the production of a battery.

By the pre-lithiation, lithium may be intercalated into the negative electrode active material according to the present invention, a problem of initial irreversibility of the negative electrode active material may be effectively prevented, and gassing according to the side reaction with an electrolyte solution may be reduced to a superior level, thereby enhancing a cycle characteristic and an output characteristic.

The extent of pre-lithiation of the negative electrode active material may be 5 to 50%, preferably, 10 to 30%, and more preferably, 10 to 25%.

The extent of pre-lithiation used herein may be defined as the actual lithiated ratio to the maximum amount of lithiation of the negative electrode active material. In addition, the extent of pre-lithiation may be defined as an amount of lithium ions actually intercalated into the negative electrode active material to the maximum amount of lithium ions capable of being intercalated into the negative electrode active material.

More specifically, the extent of pre-lithiation may be calculated by Equation 1 using an electrochemical charger/discharger.

$$\text{Extent of pre-lithiation}(\%) = (A_0 - A)/A_0 \times 100 \quad \text{[Equation 1]}$$

In Equation 1, $A_0$ is a charge capacity of a half-cell prepared of a negative electrode including a negative electrode active material before pre-lithiation and lithium metal, which is a counter electrode, when being charged at a current density of 0.1C up to a voltage of 0.005V in a CC mode, followed by charging at the same voltage of 0.005V and a current density of 0.005C in a CV mode, and A is a charge capacity of a half-cell prepared of a negative electrode for a lithium secondary battery including a negative electrode active material after pre-lithiation and lithium metal, which is a counter electrode, when being charged at a current density of 0.1C up to a voltage of 0.005V in a CC mode, followed by charging at the same voltage of 0.005V and a current density of 0.005C in a CV mode.

As the present invention has the above-described range of the extent of pre-lithiation, a passivation layer may be uniformly and stably formed on the surface of the negative electrode, and a battery reversible capacity may be enhanced, thereby improving the cycle characteristic of a battery. In addition, since gassing caused by a side reaction with an electrolyte solution which may occur by using a silicon-based material as a negative electrode active material may be significantly reduced, the volume expansion of a battery according to the continuous charging/discharging may be prevented, thereby enhancing the lifespan characteristic of a battery, and preventing a damage to the electrode structure. In addition, as the pre-lithiated negative electrode active material having the above-described range of the extent of pre-lithiation and a negative electrode including the same are preferably adjusted in balance between charging and discharging with a counter electrode (positive electrode), the excellent capacity and cycle characteristics may be exhibited.

When the extent of pre-lithiation of the negative electrode active material is less than 5%, it is difficult to uniformly form a passivation layer on the surface of the negative electrode, and the battery has an insignificant effect of improving the lifespan performance of a battery, and when the extent of pre-lithiation of the negative electrode active material is more than 50%, due to excessive lithiation, there is a risk of precipitating lithium in the form of a metal during actual electrochemical charging of a cell.

The negative electrode active material layer may further include a binder and/or a conductive material.

The binder is used to enhance the performance of a battery by enhancing the adhesive strength between the negative electrode active material layer and the current collector, and may be, for example, at least one selected from the group consisting of a polyvinylidenefluoride-hexafluoropropylene copolymer (PVDF-co-HFP), polyvinylidenefluoride (PVDF), polyacrylonitrile, polymethylmethacrylate, polyvinylalcohol, carboxymethylcellulose (CMC), starch, hydroxypropylcellulose, regenerated cellulose, polyvinylpyrrolidone, polytetrafluoroethylene, polyethylene, polypropylene, polyacrylic acid, an ethylene-propylene-diene monomer (EPDM), sulfonated EPDM, SBR, fluoro rubber, and the above-mentioned material in which a hydrogen is substituted with Li, Na, Ca, etc., and various copolymers thereof.

The conductive material is not particularly limited as long as it has conductivity without causing a chemical change in a battery, and for example, graphite such as natural graphite or artificial graphite; carbon black such as, acetylene black, Ketjen black, channel black, furnace black, lamp black or thermal black; a conductive fiber such as a carbon fiber or a metal fiber; a conductive tube such as a carbon nanotube; metal powder such as fluorocarbon powder, aluminum powder or nickel powder; a conductive whisker such as zinc oxide or potassium titanate; a conductive metal oxide such as titanium oxide; or a conductive material such as a polyphenylene derivative may be used.

The thickness of the negative electrode active material layer may be 10 to 100 μm, and preferably 50 to 80 μm.

The above-described negative electrode for a lithium secondary battery may include a silicon-based material, and a negative electrode active material having a specific extent of pre-lithiation, thereby exhibiting an excellent cycle characteristic and an excellent capacity characteristic.

Method of Preparing Negative Electrode for Lithium Secondary Battery

In addition, the present invention provides a method of preparing the above-described negative electrode for a lithium secondary battery.

Specifically, the method of preparing the above-described negative electrode for a lithium secondary battery includes: forming a negative electrode active material layer including a negative electrode active material including a silicon-based material on a negative electrode current collector; coating the negative electrode active material layer with lithium metal powder at a loading amount of 0.05 to 0.5 mg/cm$^2$; pressing the negative electrode active material layer coated with the lithium metal powder; wetting the pressed negative electrode active material layer with a first electrolyte solution; and drying the wet negative electrode active material layer.

In the method of preparing a negative electrode for a lithium secondary battery, an electrode assembly is prepared by performing pre-lithiation by wetting the pressed negative electrode active material layer with a first electrolyte solution and drying the wet negative electrode active material layer in the preparation of a negative electrode, rather than performing pre-lithiation by injecting an electrolyte solution after forming the electrode assembly. Accordingly, a stable film may be formed on the surface of the active material layer, thereby effectively reducing gassing due to a side reaction with an electrolyte solution. In addition, according to the method of preparing a negative electrode for a lithium secondary battery of the present invention, the formation of a void on the surface of an electrode and a cell distortion phenomenon, caused by the loss of the lithium metal powder through ionization by injecting an electrolyte solution after the preparation of the electrode assembly, may be prevented, thereby enhancing the cycle characteristic of a lithium secondary battery.

In addition, according to the method of preparing a negative electrode for a lithium secondary battery of the present invention, by applying the lithium metal powder on the negative electrode active material layer at a specific loading amount and pressing the coated lithium metal powder, uniform lithiation for the negative electrode active material is possible loading amount, and it is possible to control the extent of pre-lithiation according to the present invention, thereby effectively preventing the problem of initial irreversibility of the negative electrode active material, and reducing gassing caused by a side reaction with an electrolyte solution to an excellent level. As a result, the cycle and output characteristics of a battery may be enhanced.

Hereinafter, a method of preparing the above-described negative electrode for a lithium secondary battery will be described.

The method of preparing a negative electrode for a lithium secondary battery includes forming a negative electrode active material layer including a negative electrode active material including a silicon-based material on a negative electrode current collector.

The descriptions of the negative electrode current collector, the negative electrode active material and the negative electrode active material layer have been described above.

The method of preparing a negative electrode for a lithium secondary battery includes coating the negative electrode active material layer with lithium metal powder.

The coating with lithium metal powder may be performed by spraying, loading or disposing the lithium metal powder onto the negative electrode active material layer, such that the lithium metal powder is brought into a contact with or faces the negative electrode active material. Specifically, the lithium metal powder may be applied on the negative electrode active material layer by spraying, but the present invention is not limited thereto.

The lithium metal powder may be applied on the negative electrode active material layer at a loading amount of 0.05 to 0.5 mg/cm$^2$, preferably, 0.1 to 0.3 mg/cm$^2$, more preferably, 0.2 to 0.3 mg/cm$^2$, and therefore, it is possible to achieve the extent of pre-lithiation according to the present invention. When the lithium metal powder is applied at a loading amount of less than 0.05 mg/cm$^2$, it is difficult to uniformly form a passivation layer on the surface of the negative electrode, and thus an effect of improving the lifespan performance of a battery is insignificant, and when the lithium metal powder is applied at a loading amount of more than 0.5 mg/cm$^2$, there is a risk of the precipitation of lithium impurities due to excessive lithiation.

The average particle size ($D_{50}$) of the lithium metal powder may be 5 to 200 μm, preferably, 10 to 100 μm, more preferably, 20 to 80 μm, and the most preferably, 30 to 50 μm. When the lithium metal powder has the above range of the average particle size, the side reactions of the powder surface may be prevented, it is preferable in terms of excellent ionization in pre-lithiation, and thus the charge/discharge characteristics and the cycle characteristic may be further enhanced.

In the specification, the average particle size ($D_{50}$) may be defined as a particle size corresponding to 50% in a cumulative volume-based particle size distribution curve. The average particle size ($D_{50}$) may be measured, for example, using a laser diffraction method. The laser diffraction method generally enables to measurement of a particle size in a range from about submicrons to several mm, and may obtain a result with high reproducibility and high resolution.

The method of preparing a negative electrode for a lithium secondary battery includes pressing negative electrode active material layer on which the lithium metal powder is disposed.

Through the pressing process, the lithium metal powder may be alloyed with the negative electrode active material, or inserted or distributed in the negative electrode active material in the form of a lithium ion, a lithium compound and/or a lithium metal.

The pressing process may be performed using a roll press, but the present invention is not limited thereto.

The pressure applied to the pressing process may be a nip pressure, which is applied at 0.2 to 30 kN/cm, and preferably, 0.5 to 10 kN/cm. When the negative electrode active material layer is pressed within the above-described pressure range, the lithium metal powder may be easily and evenly distributed and inserted into the negative electrode active material layer, and the negative electrode active material layer may not experience deformation, for example, damage or a change in porosity due to an excessively high pressure.

The method of preparing a negative electrode for a lithium secondary battery includes preparing a negative electrode for a lithium secondary battery by wetting the pressed negative electrode active material layer with a first electrolyte solution.

For example, in the method of preparing a negative electrode for a lithium secondary battery according to the present invention, rather than producing a lithium secondary battery by preparing an electrode assembly by assembling a pressed negative electrode, a positive electrode and a separator and then injecting an electrolyte solution, individually, the pressed negative electrode active material layer is wetted with the first electrolyte solution during the preparation of a negative electrode. Therefore, in the method of preparing a negative electrode for a lithium secondary battery according to the present invention, the lithium metal powder may be uniformly distributed, and then ionized and diffused in an electrolyte solution, thereby effectively preventing the formation of a void, and accordingly, the rapid charge/discharge characteristics and the cycle characteristic of the lithium secondary battery may be enhanced. In addition, gassing caused by a side reaction with an electrolyte solution, which may occur by using a silicon-based material as a negative electrode active material, may be significantly reduced, thereby preventing the volume expansion of a battery according to continuous charging/discharging. As a result, the lifespan characteristic of the battery may be enhanced, and the damage to an electrode structure may be prevented.

The first electrolyte solution may include a first electrolyte and a first non-aqueous organic solvent, which are conventionally applied to a negative electrode for a lithium secondary battery, without limitation.

The lithium salt included as the first electrolyte, which is used herein, may be any one which is conventionally used for an electrolyte for a lithium secondary battery without limitation, and for example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$ may be used as an anion of the lithium salt.

As the first non-aqueous organic solvent included in the first electrolyte solution, those conventionally used for an electrolyte solution for a secondary battery may be used without limitation, and representatively, any one or a mixture of two or more selected from the group consisting of propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulfolane, γ-butyrolactone, propylene sulfite and tetrahydrofuran may be used. Specifically, among the carbonate-based organic solvents, cyclic carbonates, such as ethylene carbonate and propylene carbonate, are preferably used, because they are organic solvents with high viscosity and high permittivity, which easily dissolve a lithium salt in an electrolyte. When a cyclic carbonate is mixed with a linear carbonate with low viscosity and low permittivity, such as dimethyl carbonate or diethyl carbonate, in a suitable ratio, an electrolyte solution having high electric conductivity may be prepared. For this reason, the resulting carbonate mixture is more preferably used.

Optionally, the first electrolyte solution according to the present invention may further include an additive such as an overcharge inhibitor included in a conventional electrolyte solution.

There is no particular limit to a time for wetting with the first electrolyte solution, but the wetting with the first electrolyte solution may be performed for 20 to 80 minutes in consideration of sufficient ionization and pre-lithiation of the lithium metal powder.

The method of preparing a negative electrode for a lithium secondary battery includes drying the wet negative electrode active material layer.

In the method of preparing a negative electrode for a lithium secondary battery, the pre-lithiation of the negative electrode active material is carried out by performing wetting with a first electrolyte solution and drying after the lithium metal powder is disposed on the negative electrode active material layer. Therefore, in the method of preparing a negative electrode for a lithium secondary battery of the present invention, compared with the method in which pre-lithiation is carried out by injecting an electrolyte solution after the preparation of an electrode assembly, pore generation which may be caused by dissolving the lithium metal powder, and an electrode distortion phenomenon may be reduced, and a degree of ionization of the lithium metal powder in the active material layer may be further enhanced. In addition, due to the stable formation of a passivation layer by the pre-lithiation, gassing caused by a side reaction with an electrolyte solution may be significantly prevented, resulting in further enhancing the cycle characteristic of a battery.

There is no particular limit to the drying method, which may be, for example, a lukewarm and natural drying method. The drying may be suitably adjusted with respect to a content of the negative electrode active material or electrolyte solution, and may be performed at, for example, 25 to 60° C. for 10 to 180 minutes.

Lithium Secondary Battery

In addition, the present invention provides a lithium secondary battery, which includes the above-described negative electrode for a lithium secondary battery. The lithium secondary battery may include the above-described negative electrode for a lithium secondary battery, a positive electrode, and a separator which are interposed between the negative electrode and the positive electrode, and a second electrolyte solution.

Specifically, the lithium secondary battery of the present invention may be produced by injecting a second electrolyte solution of the present invention into an electrode structure consisting of a positive electrode, a negative electrode and a separator interposed between the positive electrode and the negative electrode. Here, the positive electrode, the negative electrode and the separator, which constitutes the electrode structure, may be those conventionally used in the production of a lithium secondary battery.

Here, the positive electrode may be prepared by coating a positive electrode current collector with a positive electrode active material slurry including a positive electrode active material and selectively including a binder, a conductive material and a solvent, followed by drying and roll-pressing.

In the positive electrode for a lithium secondary battery, the positive electrode current collector is not particularly limited as long as it has high conductivity without causing a chemical change in the battery, and may be, for example, stainless steel, aluminum, nickel, titanium, calcined carbon, or aluminum or stainless steel whose surface is treated with carbon, nickel, titanium or silver.

The positive electrode active material is a compound enabling reversible intercalation and deintercalation of lithium, and specifically, may be a lithium composite metal oxide including one or more metals selected from cobalt, manganese, nickel and aluminum and a lithium. More specifically, the lithium composite metal oxide may be any one or two or more compounds selected from the group consisting of a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (where $0<Y<1$), $LiMn_{2-z}Ni_zO_4$ (where $0<Z<2$), etc.), a lithium-nickel-cobalt-based oxide (e.g., $LiNi_{1-Y1}Co_{Y1}O_2$ (where $0<Y1<1$), etc.), a lithium-manganese-cobalt-based oxide (e.g., $LiCo_{-Y2}Mn_{Y2}O_2$ (where $0<Y2<1$), $LiMn_{2-z1}Co_{z1}O_4$ (where $0<Z1<2$), etc.), a lithium-nickel-manganese-cobalt-based oxide (e.g., $Li(Ni_pCo_qMn_{r1})O_2$ (where $0<p<1$, $0<q<1$, $0<r<1$, $p+q+r1=1$), $Li(Ni_{p1}Co_{q1}Mn_{r2})O_4$ (where $0<p1<2$, $0<q1<2$, $0<r2<2$, $p1+q1+r2=2$), etc.), and a lithium-nickel-cobalt-transition metal (M) oxide (e.g., $Li(Ni_{p2}Co_{q2}Mn_{r3}M_{s2})O_2$ (where M is selected from the group consisting of Al, Fe, V, Cr, Ti, Ta, Mg and Mo, and each of p2, q2, r3 and s2 is the atomic fraction of an independent element, $0<p2<1$, $0<q2<1$, $0<r3<1$, $0<s2<1$, and $p2+q2+r3+s2=1$), etc.). Among these, to increase the capacity characteristic and stability of the battery, the lithium composite metal oxide may be $LiCoO_2$, $LiMnO_2$, $LiNiO_2$, a lithium-nickel-manganese-cobalt oxide (e.g., $Li(Ni_{0.6}Mn_{0.2}Co_{0.2})O_2$, $Li(Ni_{0.5}Mn_{0.3}Co_{0.2})O_2$, $Li(Ni_{0.8}Mn_{0.1}Co_{0.1})O_2$, etc.), or a lithium-nickel-cobalt-aluminum oxide (e.g., $Li(Ni_{0.8}Co_{0.15}Al_{0.05})O_2$, etc.), and in consideration of the significant improvement effect by controlling the type and content ratio of a constituent element for the lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$ or $Li(Ni_{0.8}Mn_{0.1}Co_{0.1})O_2$, which may be used alone or in combination with two or more thereof.

The positive electrode active material may be included at 80 to 99 wt % with respect to the total weight of the positive electrode mixture.

The binder is a component for assisting the binding between an active material and a conductive material or the like, and binding to a current collector, and may be conventionally added at 1 to 30 wt % with respect to the total weight of the positive electrode mixture. The binder may be, for example, polyvinylidenefluoride, polyvinylalcohol, carboxymethylcellulose (CMC), starch, hydroxypropylcellulose, regenerated cellulose, polyvinylpyrrolidone, tetrafluoroethylene, polyethylene, polypropylene, EPDM, sulfonated EPDM, SBR, fluororubber, or any one of various copolymers thereof.

The conductive material is conventionally added at 1 to 30 wt % with respect to the total weight of the positive electrode mixture.

The conductive material is not particularly limited as long as it does not cause a chemical change in the battery and has conductivity, and for example, graphite; a carbon-based material such as carbon black, acetylene black, Ketjen black, channel black, furnace black, lamp black or thermal black; a conductive fiber such as a carbon fiber or a metal fiber; metal powder such as fluoro carbon, aluminum or nickel powder; a conductive whisker such as zinc oxide or potassium titanate; a conductive metal such as titanium oxide; or a conductive material such as a polyphenylene derivative may be used. Specific examples of commercially available conductive materials include the acetylene black series (Chevron Chemical Company), Denka black (Denka Singapore Private Limited), products of Gulf Oil Company, Ketjen black, the EC series (products of Armak Company), Vulcan XC-72 (product of Cabot Company) and Super P (product of Timcal).

The solvent may be an organic solvent such as N-methyl-2-pyrrolidone (NMP), and may be used at an amount such that the positive electrode active material slurry has a preferable viscosity when including the positive electrode active material, and selectively, a binder and a conductive material. For example, the solvent may be included such that the concentration of a solid content including the positive electrode active material, and selectively, a binder and a conductive material becomes 50 to 95 wt %, and preferably, 70 to 90 wt %.

In the lithium secondary battery, a separator is to separate the negative electrode from the positive electrode and provide a migration path of lithium ions, and is not particularly limited as long as it is used as a separator in a conventional lithium secondary battery. Particularly, a separator which has low resistance to ion migration of an electrolyte and excellent wettability in an electrolyte solution is preferably used. Specifically, the separator may be a porous polymer film, for example, a porous polymer film prepared of a polyolefin-based polymer, such as an ethylene homopolymer, a propylene homopolymer, an ethylene/butene copolymer, an ethylene/hexene copolymer or an ethylene/methacrylate copolymer, or a stacked structure of two or more layers thereof. In addition, a conventional porous non-woven fabric, for example, a non-woven fabric formed of a glass fiber having a high melting point or a polyethylene terephthalate fiber may be used. In addition, a coated separator containing a ceramic component or a polymer material may be used to ensure thermal resistance or mechanical strength, and may be selectively formed in a single- or multi-layered structure.

In addition, a second electrolyte solution used in the present invention may include a secondary non-aqueous organic solvent and a second electrolyte.

The second electrolyte may be an organic liquid electrolyte, an inorganic liquid electrolyte, a solid polymer electrolyte, a gel-type polymer electrolyte, a solid inorganic electrolyte, or a melt-type inorganic electrolyte, which can be used in production of a lithium secondary battery, but the present invention is not limited thereto.

Specifically, the second electrolyte may include a lithium salt. The lithium salt may be a compound capable of providing lithium ions used in a lithium secondary battery without particular limitation. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$. The concentration of the lithium salt is preferably used within a range of 0.1 to 2.0M. When the concentration of a lithium salt is included in the above range, due to suitable conductivity and viscosity, the electrolyte may exhibit excellent electrolyte performance, and lithium ions may effectively migrate.

As the second non-aqueous organic solvent, an organic solvent which can serve as a medium capable of migrating ions involved in the electrochemical reaction of a battery may be used without particular limitation. Specifically, the second non-aqueous organic solvent may be an ester-based solvent such as methyl acetate, ethyl acetate, γ-butyrolactone, ε-caprolactone, etc.; an ether-based solvent such as dibutyl ether, tetrahydrofuran, etc.; a ketone-based solvent such as cyclohexanone, etc.; an aromatic hydrocarbon-based solvent such as benzene, fluorobenzene, etc.; a carbonate-based solvent such as dimethyl carbonate (DMC), diethyl carbonate (DEC), methylethyl carbonate (MEC), ethylmethyl carbonate (EMC), ethylene carbonate (EC), propylene carbonate (PC), etc.; an alcohol-based solvent such as ethyl alcohol, isopropyl alcohol, etc.; a nitrile-based solvent such as R—CN (R is a linear, branched or cyclic C2 to C20 hydrocarbon group, and may include a double bond aromatic ring or an ether bond), etc.; an amide-based solvent such as dimethylformamide, etc.; a dioxolane-based solvent such as 1,3-dioxolane, etc.; or a sulfolane-based solvent. Among these, a carbonate-based solvent is preferably used, and a mixture of a cyclic carbonate having high ion conductivity and high permittivity to increase the charge/discharge performance of a battery (for example, ethylene carbonate, propylene carbonate, etc.) and a low-viscosity linear carbonate-based compound (for example, ethyl methyl carbonate, dimethyl carbonate, diethyl carbonate, etc.) is more preferably used. In this case, by using a mixture of a cyclic carbonate and a chain-type carbonate in a volume ratio of about 1:1 to about 1:9, the electrolyte solution may exhibit excellent performance.

Since the lithium secondary battery according to the present invention stably exhibits excellent discharge capacity, rapid charge/discharge characteristics and a capacity retention, it is useful in portable devices such as a mobile phone, a notebook computer, a digital camera, etc., and the field of an electric automobile such as a hybrid electric vehicle (HEV), etc. Particularly, the lithium secondary battery is preferably used as a constituent battery for medium-to-large battery modules. Accordingly, the present invention provides a medium-to-large battery module including the above-described secondary battery as a unit battery.

Such a medium-to-large battery module is preferably applied as a power source requiring high power and large capacity for electric vehicles, hybrid electric vehicles, electric powder storage devices, etc.

Method of Producing Lithium Secondary Battery

In addition, the present invention provides a method of producing a lithium secondary battery, which includes: preparing the negative electrode for a lithium secondary battery prepared by the above-described method of preparing a negative electrode for a lithium secondary battery; preparing a positive electrode for a lithium secondary battery; and interposing a separator between the negative electrode for a lithium secondary battery and the positive electrode for a lithium secondary battery.

The descriptions for the negative electrode for a lithium secondary battery, the positive electrode for a lithium secondary battery and the separator have been described.

The method of preparing a lithium secondary battery may further include injecting the second electrolyte solution into the negative electrode for a lithium secondary battery and the positive electrode for a lithium secondary battery.

The description on the secondary electrolyte solution has been described above.

According to the present invention, a lithium secondary battery in which cell distortion is prevented and a stable passivation layer is formed can be produced by pre-lithiation which is previously performed before the injection of the second electrolyte solution, rather than pre-lithiation performed by the injection of the second electrolyte solution.

Hereinafter, for clarity, the present invention will be described in further detail with reference to examples and experimental examples, but is not limited to the examples and experimental examples. However, the present invention may be implemented in a variety of different forms, and is not limited to the embodiments described herein. Examples of the present invention will be provided to more completely explain the present invention to those of ordinary skill in the art.

EXAMPLES AND COMPARATIVE EXAMPLES

Example 1

1. Formation of Negative Electrode Active Material Layer

As a negative electrode active material, a mixture of graphite and SiO in a weight ratio of 70:30 was prepared. Afterward, a negative electrode active material slurry was prepared by mixing the negative electrode active material, Denka black (conductive material), SBR (binder) and CMC (thickening agent) in a weight ratio of 92:3:3.5:1.5, and then a negative electrode active material layer was formed by coating one surface of a copper current collector (size: 10 cm×20 cm) with the negative electrode mixture slurry and drying the coated negative electrode mixture slurry. At this time, the temperature of circulating air was 80° C. Subsequently, a negative electrode was prepared through roll pressing and drying in a vacuum oven at 130° C. for 12 hours.

2. Coating of Lithium Metal Powder

Lithium metal powder having an average particle size ($D_{50}$) of 40 μm was coated and disposed on the negative electrode active material layer at a loading amount of 0.3 mg/cm².

3. Pressing, Wetting with First Electrolyte Solution, and Drying (Pre-Lithiation)

The negative electrode active material layer on which the lithium metal powder is disposed was roll-pressed under a nip pressure of 5 kN/cm.

Afterward, the pressed negative electrode active material layer and a negative electrode current collector were wetted with an 1M $LiPF_6$ solvent prepared by mixing ethylene carbonate (EC) and ethylmethyl carbonate (EMC) in a volume ratio of 50:50 (first electrolyte solution).

About 120 minutes later, a negative electrode was taken out from the electrolyte solution, washed with DMC and then dried in a vacuum oven at 40° C. for 1 hour, thereby preparing a negative electrode for a lithium secondary battery including a lithium-intercalated negative electrode active material through pre-lithiation.

4. Production of Coin-Type Half-Cell

A coin-type half-cell of Example 1 was produced by punching the prepared negative electrode for a lithium secondary battery to a coin-cell size, interposing a polyolefin separator between the coin-cell sized negative electrode and lithium metal foil, which is a counter electrode, and injecting an electrolyte solution (second electrolyte solution) in which 1M LiPF$_6$ was dissolved in a solvent prepared by mixing EC and EMC in a volume ratio of 50:50.

Example 2

A negative electrode for a lithium secondary battery of Example 2 and a coin-type half-cell including the same were produced by the same method as described in Example 1, except that lithium metal powder was applied at a loading amount of 0.2 mg/cm$^2$.

Example 3

A negative electrode for a lithium secondary battery of Example 3 and a coin-type half-cell including the same were produced by the same method as described in Example 1, except that lithium metal powder was applied at a loading amount of 0.4 mg/cm$^2$.

Example 4

A negative electrode for a lithium secondary battery of Example 4 and a coin-type half-cell including the same were produced by the same method as described in Example 1, except that lithium metal powder was applied at a loading amount of 0.15 mg/cm$^2$.

Comparative Example 1

A negative electrode for a lithium secondary battery of Comparative Example 1 which was not subjected to pre-lithiation and a coin-type half-cell including the same were produced by the same method as described in Example 1, except that, after the formation of a negative electrode active material layer, coating and pressing of lithium metal powder, and wetting with a first electrolyte solution and drying were not performed.

Comparative Example 2

A negative electrode for a lithium secondary battery of Comparative Example 2 and a coin-type half-cell including the same were produced by the same method as described in Example 1, except that lithium metal powder was applied at a loading amount of 0.04 mg/cm$^2$.

Comparative Example 3

A negative electrode for a lithium secondary battery of Comparative Example 3 and a coin-type half-cell including the same were produced by the same method as described in Example 1, except that lithium metal powder was applied at a loading amount of 0.6 mg/cm$^2$.

Comparative Example 4

A negative electrode for a lithium secondary battery of Comparative Example 4 and a coin-type half-cell including the same were produced by the same method as described in Example 1, except that a negative electrode active material slurry was prepared by mixing graphite as a negative electrode active material, Denka black (conductive material), SBR (binder) and CMC (thickening agent) in a weight ratio of 92:3:3.5:1.5, and lithium metal powder was applied at a loading amount of 0.2 mg/cm$^2$.

EXPERIMENTAL EXAMPLES

Experimental Example 1: Measurement of Extent of Pre-Lithiation (1) Production of Negative Electrode Including Negative Electrode Active Material Before Pre-Lithiation and Coin-Type Half-Cell A negative electrode active material layer was formed by preparing a negative electrode active material slurry by mixing each of the negative electrode active materials of Examples and Comparative Examples, Denka black (conductive material), SBR (binder) and CMC (thickening agent) in a weight ratio of 92:3:3.5:1.5, and coating and drying the negative electrode active material slurry on one surface of a copper current collector (size: 10 cm×20 cm). At this time, the temperature of circulating air was 80° C. Subsequently, a negative electrode including a negative electrode active material which was not subjected to pre-lithiation was prepared through roll pressing and drying in a vacuum oven at 130° C. for 12 hours. The negative electrode was not subjected to separate coating and pressing of lithium metal powder, and wetting with a first electrolyte solution.

Subsequently, by the same method as described in Example 1, a coin-type half-cell was produced using the above-described negative electrode.

(2) Measurement of Extent of Pre-Lithiation

In Examples and Comparative Examples, coin-type half-cells produced using the above-described negative electrode including the negative electrode active material which was not subjected to pre-lithiation and a negative electrode including a pre-lithiated negative electrode active material were prepared.

Afterward, charge capacities (A$_0$) of the coin-type half-cell produced using the above-described negative electrode including the negative electrode active material which was not subjected to pre-lithiation when being charged at a current density of 0.1C up to a voltage of 0.005V (vs. Li/Li+) in a CC mode and charged at the same voltage of 0.005V (vs. Li/Li+) up to a current density of 0.005C in a CV mode using an electrochemical charger/discharger were measured.

Subsequently, charge capacities (A) of the coin-type half-cells produced using the negative electrodes for a lithium secondary battery according to Examples and Comparative Examples when being charged at a current density of 0.1C up to a voltage of 0.005V (vs. Li/Li+) in a CC mode, and charged at the same voltage of 0.005V (vs. Li/Li+) up to a current density of 0.005C in a CV mode using an electrochemical charger/discharger were measured. The extents of pre-lithiation of the negative electrode active materials according to Examples and Comparative Examples were calculated by substituting the measured A$_0$ and A into Equation 1, and the results are shown in Table 1.

TABLE 1

| Classification | A$_0$ (mAh/g) | A (mAh/g) | Extent of pre-lithiation (%) |
|---|---|---|---|
| Example 1 | 952 | 714 | 25 |
| Example 2 | 952 | 752 | 21 |
| Example 3 | 952 | 619 | 35 |
| Example 4 | 952 | 876 | 8 |
| Comparative Example 1 | 952 | 952 | 0 |
| Comparative Example 2 | 952 | 914 | 4 |

TABLE 1-continued

| Classification | $A_0$ (mAh/g) | A (mAh/g) | Extent of pre-lithiation (%) |
|---|---|---|---|
| Comparative Example 3 | 952 | 428 | 55 |
| Comparative Example 4 | 355 | 266 | 25 |

Experimental Example 2: Measurement of Gassing Amount

A pouch-type full-cell was produced by interposing a polyolefin separator between each of the negative electrodes for a lithium secondary battery of Examples and Comparative Examples and a counter electrode $LiCoO_2$, and then injecting an electrolyte solution (second electrolyte solution) in which 1M $LiPF_6$ was dissolved in a solvent prepared by mixing ethylene carbonate (EC) and ethylmethyl carbonate (EMC) in a volume ratio of 50:50.

A charge/discharge cycle test was performed for the pouch-type full-cell including each of the negative electrodes for a lithium secondary battery in Examples and Comparative Examples, using an electrochemical charger/discharger. Charging was performed by applying a current at a current density of 0.5C-rate up to a voltage of 4.2V, and discharging was performed at the same current density up to a voltage of 2.5V. A gassing amount after 300 cycles was measured, and the result is shown in Table 2.

TABLE 2

| | | Example | | | | Comparative Example | | | |
|---|---|---|---|---|---|---|---|---|---|
| Classification | | 1 | 2 | 3 | 4 | 1 | 2 | 3 | 4 |
| Gas content (µl) | $H_2$ | <0.1 | <0.1 | <0.1 | <0.1 | 826 | 523 | <0.1 | <0.1 |
| | CO | 20.4 | 22.1 | 15.3 | 26.2 | 28.1 | 26.4 | 14.1 | 11.1 |
| | $CO_2$ | 8.2 | 8.4 | 7.4 | 8.5 | 8.7 | 8.7 | 7.1 | 7.2 |
| | $CH_4$ | 2340 | 2520 | 2130 | 2730 | 3900 | 3200 | 2110 | 1610 |
| | $C_2H_2$ | 38.9 | 33.8 | 31.4 | 41.5 | <0.1 | <0.1 | <0.1 | <0.1 |
| | $C_2H_4$ | 106 | 121 | 98 | 132 | 141 | 136 | 95 | 87 |
| | $C_2H_6$ | 544 | 650 | 530 | 710 | 912 | 872 | 512 | 452 |
| | $C_3H_6$ | <0.1 | <0.1 | <0.1 | <0.1 | <0.1 | <0.1 | <0.1 | <0.1 |
| | $C_3H_8$ | 17.1 | 21.3 | 15.1 | 25.1 | 27.6 | 26.1 | 25.2 | 11.3 |
| | Total | 3075 | 3377 | 2827.2 | 3673.3 | 5843 | 4792.2 | 2763.4 | 2178.6 |

Experimental Example 3: Evaluation of Capacity Characteristic

A charge/discharge cycle test was performed for the pouch-type full-cells produced in Experimental Example 2, including each of the negative electrodes of Examples and Comparative Examples, using an electrochemical charger/discharger. Charging was performed by applying a current at a current density of 0.5C-rate up to a voltage of 4.2V, and discharging was performed at the same current density up to a voltage of 2.5V. Initial discharge capacities and discharge capacities after 300 cycles are shown in Table 3.

TABLE 3

| Classification | Initial discharge capacity (mAh) | Discharge capacity after 300 cycles (mAh) | Discharge capacity after 300 cycles/ initial discharge capacity |
|---|---|---|---|
| Example 1 | 951 | 791 | 0.83 |
| Example 2 | 947 | 773 | 0.82 |
| Example 3 | 936 | 751 | 0.80 |
| Example 4 | 902 | 721 | 0.79 |
| Comparative Example 1 | 786 | 341 | 0.43 |
| Comparative Example 2 | 821 | 524 | 0.64 |
| Comparative Example 3 | 893 | 621 | 0.70 |
| Comparative Example 4 | 576 | 482 | 0.83 |

Experimental Example 4: Observation of Appearance of Pouch-Type Battery

The appearances of pouch-type full-cells of Example 1 and Comparative Example 1 after 300 cycles, which were evaluated in Experimental Example 2, were observed, and the results are shown in FIG. 1 (Example 1) and FIG. 2 (Comparative Example 1).

Experimental Example 5: FE-SEM Observation

The appearances of the negative electrode active material layers in the pouch-type full-cells of Example 1 and Comparative Example 3 after 300 cycles, which were evaluated in Experimental Example 2, were observed using FE-SEM, and the results are shown in FIG. 3 (Example 1) and FIG. 4 (Comparative Example 3).

Referring to Tables 2 and 3 and FIGS. 1 to 4, it can be confirmed that the lithium secondary batteries including the negative electrodes for a lithium secondary battery of Examples have a small gassing amount, high discharge capacity, and an excellent cycle characteristic.

It can be confirmed that, compared with Example 1, in Example 3 showing a slightly higher extent of pre-lithiation, gassing was slightly reduced, initial discharge capacity was lowered, and the cycle characteristic was slightly degraded. It was considered that such performance degradation is because a balance between charging and discharging of the negative electrode and the positive electrode is slightly upset. However, compared with Comparative Examples, Example 3 was evaluated to exhibit significantly excellent performance.

It can be confirmed that, in Example 4 having a slightly lower extent of pre-lithiation, compared with Example 1, slightly poor performance was not shown in terms of the gassing amount, the initial discharge capacity and the cycle characteristic, but compared with Comparative Examples 1 and 2, a significantly excellent capacity characteristic was exhibited.

In Comparative Examples 1 and 2 in which the pre-lithiation process was not performed or the extent of pre-lithiation was very low, a gassing amount was very high, the initial discharge capacity was very low, and the cycle characteristic was also very degraded. Particularly, referring to FIGS. 1 and 2, it can be confirmed that, in the pouch-type battery of Comparative Example 1 which was not subjected to pre-lithiation, compared with the battery of Example 1, a lot of gas was generated, and thus the pouch-type battery was significantly swollen.

In Comparative Example 3 having an excessively high extent of pre-lithiation, it was evaluated that a gassing amount was reduced by previously performing a side reaction caused by pre-lithiation, but the capacity was reduced due to a very poor balance between charging and discharging of the negative electrode and the positive electrode, and the cycle characteristic is not very good because of the precipitation of lithium metal. Particularly, referring to FIGS. 3 and 4, it can be confirmed that almost no precipitation of lithium metal is found in the negative electrode active material layer of Example 1, and lithium metal was precipitated in a slender shape in the negative electrode active material layer in Comparative Example 3.

In Comparative Example 4 using only graphite as a negative electrode active material, due to a very poor balance between charging and discharging in the positive and negative electrodes, the battery was rapidly decreased in initial discharge capacity, and had low capacity even after 300 cycles. However, although Comparative Example 4 exhibited low gassing, it is considered that this is because the graphite has low surface impurities.

The invention claimed is:

1. A method of preparing a negative electrode for a lithium secondary battery, comprising:
    forming a negative electrode active material layer comprising a negative electrode active material including a silicon-based material and a carbon-based material on a negative electrode current collector,
        wherein the negative electrode active material includes the carbon-based material and the silicon-based material in a weight ratio of 60:40 to 95:5,
        the carbon-based material is artificial graphite, natural graphite or a mixture of the artificial graphite and the natural graphite, and
        the silicon-based material includes a compound represented by $SiO_x$ (0≤x<2);
    coating the negative electrode active material layer with lithium metal powder at a loading amount of 0.05 mg/cm$^2$ to 0.5 mg/cm$^2$;
    pressing the negative electrode active material layer coated with the lithium metal powder such that the lithium metal powder is alloyed with the negative electrode active material or inserted or distributed in the negative electrode active material in a form of a lithium ion or a lithium compound and/or a lithium metal;
    wetting the pressed negative electrode active material layer with a first electrolyte solution; and
    drying the wet negative electrode active material layer, wherein an average particle size ($D_{50}$) of the lithium metal powder is 30 μm to 200 μm, and
    wherein the pressing is performed with a nip pressure of 0.5 kN/cm to 10 kN/cm using a roll press to have 5% to 35% of a pre-lithiation of the negative electrode active material calculated by Equation 1 below:

$$\text{Extent of pre-lithiation}(\%) = (A_0 - A)/A_0 \times 100 \qquad \text{[Equation 1]}$$

where $A_0$ is a charge capacity of a half-cell prepared of a negative electrode including a negative electrode active material before the pre-lithiation and lithium, which is a counter electrode, when being charged at a current density of 0.1C up to a voltage of 0.005V in a constant current (CC) mode, followed by charging at the same voltage of 0.005V and a current density of 0.005C in a constant voltage (CV) mode, and A is a charge capacity of a half-cell prepared of a negative electrode for a lithium secondary battery including a negative electrode active material after the pre-lithiation and lithium metal, which is a counter electrode, when being charged at a current density of 0.1C up to a voltage of 0.005V in a CC mode, followed by charging at the same voltage of 0.005V and a current density of 0.005° C. in a CV mode.

2. The method according to claim 1, wherein the loading amount of the lithium metal powder is 0.1 mg/cm$^2$ to 0.3 mg/cm$^2$.

3. The method according to claim 1, wherein the loading amount of the lithium metal powder is 0.2 mg/cm$^2$ to 0.3 mg/cm$^2$.

4. The method according to claim 1, wherein an average particle size ($D_{50}$) of the lithium metal powder is 30 μm to 100 μm.

5. The method according to claim 1, wherein an average particle size ($D_{50}$) of the lithium metal powder is 30 μm to 80 μm.

6. The method according to claim 1, wherein an average particle size ($D_{50}$) of the lithium metal powder is 30 μm to 50 μm.

7. The method according to claim 1, wherein the negative electrode active material includes the carbon-based material and the silicon-based material in a weight ratio of 60:40 to 80:20.

8. The method according to claim 1, wherein the pre-lithiation of the negative electrode active material calculated by Equation 1 is 5 to 25%.

9. The method according to claim 1, wherein a passivation layer is formed on a surface of the negative electrode after the pressing.

10. A method of preparing a negative electrode for a lithium secondary battery, comprising:
    forming a negative electrode active material layer comprising a negative electrode active material including a silicon-based material and a carbon-based material on a negative electrode current collector,
        wherein the negative electrode active material includes the carbon-based material and the silicon-based material in a weight ratio of 60:40 to 95:5,
        the carbon-based material is artificial graphite, natural graphite or a mixture of the artificial graphite and the natural graphite, and
        the silicon-based material includes a compound represented by $SiO_x$ (0≤x<2);
    coating the negative electrode active material layer with a coating material consisting of lithium metal powder at a loading amount of 0.05 mg/cm$^2$ to 0.5 mg/cm$^2$;
    pressing the negative electrode active material layer coated with the coating material such that the lithium metal powder is alloyed with the negative electrode active material or inserted or distributed in the negative electrode active material in a form of a lithium ion or a lithium compound and/or a lithium metal;
wetting the pressed negative electrode active material layer with a first electrolyte solution; and
drying the wet negative electrode active material layer,
wherein an average particle size ($D_{50}$) of the lithium metal powder is 30 μm to 200 μm, and
wherein the pressing is performed with a nip pressure of 0.5 kN/cm to 10 kN/cm using a roll press to have 5% to 35% of a pre-lithiation of the negative electrode active material calculated by Equation 1 below:

$$\text{Extent of pre-lithiation}(\%) = (A_0 - A)/A_0 \times 100 \quad \text{[Equation 1]}$$

where $A_0$ is a charge capacity of a half-cell prepared of a negative electrode including a negative electrode active material before the pre-lithiation and lithium, which is a counter electrode, when being charged at a current density of 0.1C up to a voltage of 0.005V in a constant current (CC) mode, followed by charging at the same voltage of 0.005V and a current density of 0.005C in a constant voltage (CV) mode, and A is a charge capacity of a half-cell prepared of a negative electrode for a lithium secondary battery including a negative electrode active material after the pre-lithiation and lithium metal, which is a counter electrode, when being charged at a current density of 0.1C up to a voltage of 0.005V in a CC mode, followed by charging at the same voltage of 0.005V and a current density of 0.005C in a CV mode.

* * * * *